Figure 1:
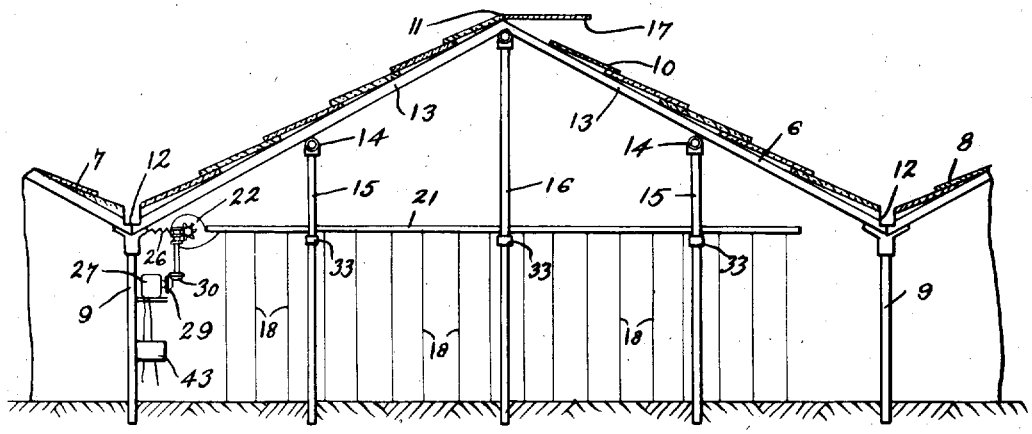

Aug. 22, 1933.   W. LAFFERTY   1,923,217
METHOD AND APPARATUS FOR POLLINATING PLANTS GROWN UNDER GLASS
Filed Sept. 29, 1932

INVENTOR.
Wheeler Lafferty
BY
Fay, Oberlin & Fay
ATTORNEYS

Patented Aug. 22, 1933

1,923,217

UNITED STATES PATENT OFFICE 1,923,217

METHOD AND APPARATUS FOR POLLINATING PLANTS GROWN UNDER GLASS

Wheeler Lafferty, Lakewood, Ohio

Application September 29, 1932
Serial No. 635,351

9 Claims. (Cl. 47—17)

The present invention relates to a method and apparatus for causing the pollination of flowers of plants normally pollinated by the action of the wind when such plates are grown under glass where natural conditions do not prevail and, more particularly, the invention relates to a method and apparatus for simulating the action of the wind in pollinating the flowers of tomato vines grown in greenhouses and the like where natural agitation of the air does not occur.

One of the difficulties encountered in growing produce under glass is that certain important products, of which the tomato is an example, bear a flower which is of the class pollinated through the action of the wind which carries the pollen to the pistils of the blossoms and fertilizes the same. Where plants are grown under glass, as in greenhouses, the action of the wind is absent and it becomes necessary to resort to artificial methods of distributing the pollen. This has been done manually by striking the tomato vines or other plants with a rubber hose or other instrument to agitate the vine and to cause the pollen to be distributed. Where the number of plants involved is large, it will be readily seen that this is a slow and laborious method, particularly in view of the fact that pollination takes place to a satisfactory degree only in sunlight. When the weather is frequently cloudy, as is often the case during the early season when crops grown under glass are most profitable, this manual agitating operation may require to be repeated many times. Other methods of inducing pollination have also been employed but all of these are expensive and time-consuming, the results obtained being only moderately satisfactory.

The method herein to be described and the apparatus for carrying out such method permits pollination to be induced without the employment of hand labor and also makes it possible to pollinate each of a large number of plants simultaneously so as to take advantage of short intervals of sunshine. It is, accordingly, an object of the invention to provide a method of inducing the pollination of plants normally fertilized by the action of the wind, which avoids the use of hand labor. Another object of the invention is to provide a method of inducing the pollination of such plants in a manner permitting the pollination of a very large number of plants simultaneously. Still another object of the invention is to provide an apparatus by which the method of the invention can be practically carried on. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 2:
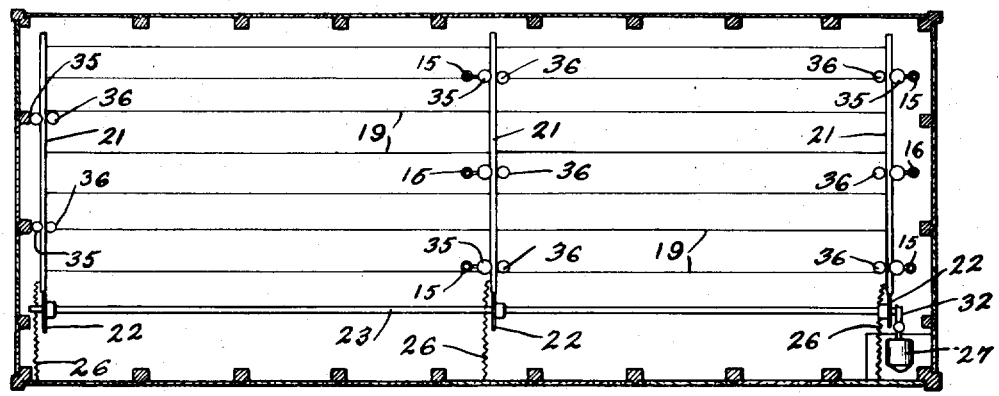
Figure 3:
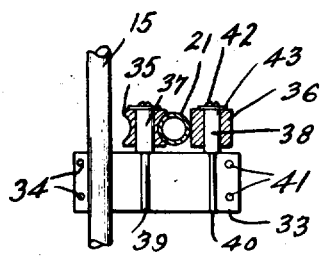
Figure 4:
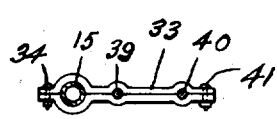
Figure 5:
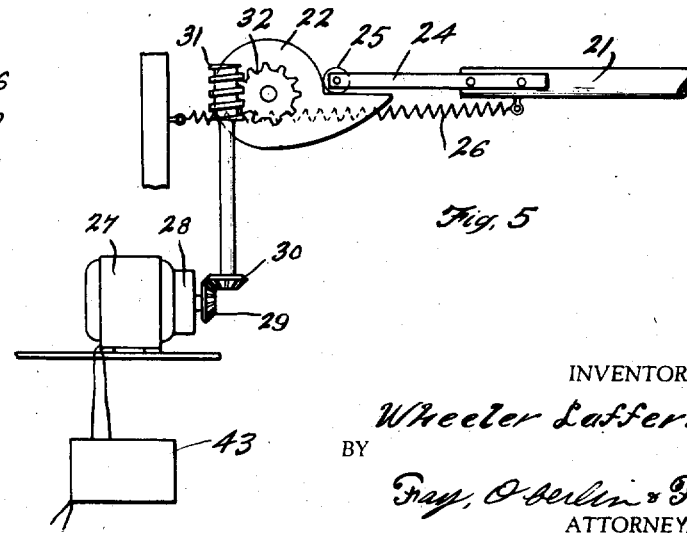

In said annexed drawing:

Fig. 1 is a vertical section taken transversely through a greenhouse unit; Fig. 2 is a horizontal section taken through such a unit; Figs. 3 and 4 are detail views of portions of the apparatus shown in Figs. 1 and 2; and Fig. 5 is another detail view of a driving means constituting part of the invention apparatus.

Referring to the drawing, a greenhouse unit 6 is a structure about thirty (30) to fifty (50) feet in width and about one hundred (100) feet long, other units 7 and 8 being connected thereto, if desired, and being supported at the points where they are joined, by side posts 9. A roof 10 slopes from the ridge 11 to the gutters 12 above the side posts 9 and sash bars 13 extend from gutter to ridge, carrying lights of glass and are supported on purlins 14 running lengthwise of the greenhouse unit. These purlins are, in turn, supported on purlin posts 15 running down into the ground below the greenhouse. Center posts 16 are similarly mounted in the ground and cooperate with the purlin posts to support the structure. Ventilating means are also provided to raise and lower the ventilators 17 adjacent to and hinged on the ridge 11 when it is desired to ventilate the structure.

When a crop, such as tomatoes, which requires overhead support, is to be grown under glass, numerous strings 18 are run from pegs in the ground to wires 19 strung lengthwise of the greenhouse and these wires are, in turn, stretched between cross bars 21 which are, most inexpensively, mounted on the purlin posts 15 and center posts 16 by means of suitable brackets or on the greenhouse end walls. Structural parts, such as the foregoing, ventilator rods and the like, may be used for supporting these cross bars 21, three points of support being ordinarily provided for a greenhouse unit of average width.

For the purposes of the present invention, these cross bars 21 are so mounted on the purlin posts and other structural members which may be used that they may slide transversely of the greenhouse. It may be noted that both the cross bars, purlin posts, etc. are best made of gas pipe since this is a standard product and satisfactorily serves the purposes for which it is used.

The cross bars 21 and the wires 19 stretched therebetween thus constitute a framework supported on the posts 15 and 16 above the tomato vines or other crop grown in the greenhouse and serving to support a multitude of approximately vertical elements, such as strings, directly supporting the vines. If, now, a sudden motion is imparted to the cross bars 21, the entire structure will be likewise moved and the vines supported by the structure will be agitated. This motion is imparted to the cross bars by cams 22 mounted on a shaft 23 extending approximately the length of the greenhouse. As shown more in detail in Fig. 5, the agitating mechanism consists of the cams 22, of which there will be one for each cross bar, an extension 24 on one end of the cross bar having a roller 25 for contact with the face of the cam, and a spring 26, attached to the cross bar and to the side of the greenhouse. The cam is driven by means of a motor 27 through a reduction gear 28, bevel gears 29 and 30 and a worm 31 meshing with a sprocket 32 on the cam. As the cam revolves, the extension 24, with the cross bar 21 to which it is attached, is gradually forced laterally away from its normal position against the pull of the spring 26 until the point of maximum displacement is reached and the cross bar and extension suddenly return to their former position under the pull of the spring 26. This periodic motion will continue as long as the motor 27 is left running and the sudden return of the cross bars 21, as each revolution of the cam is completed, agitates the wires 19 imparting a shaking motion to the strings on which the tomato vines, or other plants, are supported, so that the blossoms distribute their pollen as if agitated by the wind.

Since iron pipe is used for the cross bars 21 and there is, moreover, a considerable inward pull on the cross bars at each end of the greenhouse due to the fact that the wires 19, carrying the weight of the plants, are stretched therebetween, some method of mounting these cross bars so that they will be slidable when acted upon by the cams 22 without too much friction, must be provided. This is done by means of the structure most clearly shown in Figs. 3 and 4 of the drawing. A bracket 33 is bolted to one of the posts 15 or 16 by means of bolts 34 and carries rollers 35 and 36 mounted on spindles 37 and 38, the shafts 39 and 40 of which are secured in the bracket 33 by means of bolts 41. Screws 42 and washers 43 secure the rollers 35 and 36 in place on the spindles 37 and 38, the rollers 35 being concave to fit the surface of the pipe and maintain the cross-bars above the brackets 33 and the cylindrical rollers 36 holding the bars in the concavity so provided. In this way the cross bars are securely supported and the friction from both the weight of the supported plants and the lateral pull of the wires 19 is reduced to a minimum so that the cross bars can be reciprocated by the cam action described above without excessive wear.

Due to the fact that pollination takes place most effectively in sunlight, the method carried on by the described apparatus in order to require a minimum of attention and to be fully automatic is best performed by agitating the plants for short periods at intervals through the day. Thus, a method which agitates all of the plants in the greenhouse simultaneously for several minutes during each hour or one-half hour of daylight will be likely to distribute the pollen while the sun is shining during one or more of such periods. Accordingly, the motor 27 is controlled by a timing device 43, which may be of any standard type and does not require further description. It will also be apparent that such a timing device may control a number of motors located in different greenhouse units or in separate structures located in the same vicinity since the conditions of sunlight will be the same for all greenhouses in the neighborhood and the same treatment will be effective for each.

Various modifications of the apparatus described may be made without departing from the scope of the invention. For instance, a stroke of about four inches has been found to be effective in agitating tomato plants and the cross bars 21 may be moved through this distance and allowed to return suddenly to their former positions either by making the cam 22 of the necessary dimensions to impart a movement of this magnitude or the extensions 24 may be connected to the cross bars 21 by a lever which multiplies the movement imparted by a smaller cam to the desired degree. Also, the cam may be replaced by a circular member carrying a trip rod which periodically pushes the cross bars out of place and permits them to return under the pull of a spring similar to spring 26. In fact, any well known means of converting the rotation of a motor into a reciprocating motion may be used.

The method performed by the above described apparatus is found to be very effective in pollinating the blossoms of the tomato vine where the latter is grown under glass and is not subject to the normal action of the wind to induce pollination. Each of a large number of vines present in a greenhouse is agitated simultaneously and thus a short period during which the sun may be shining during the early part of the season may be taken advantage of to pollinate blossoms on all of the plants. This is a considerable improvement over hand methods since only a few plants can be agitated by hand during a short interval of sunshine and continuance of the operation must wait upon the next appearance of the sun, if pollination is to be satisfactory. In addition, by setting the time control 43 so that the motor runs for a few minutes at periodic intervals, agitation of the plants will be bound to occur while the sun is shining at some time during the day, so that no attention is required to insure that pollination is taking place under favorable conditions. Thus the time control may be set so that the motor runs and the plants are agitated for a few minutes each hour or half-hour from the middle of the morning, by which time a supply of pollen is dried, until the middle of the afternoon, by which time the pollen which is dried during that day has been distributed and further agitation would produce no additional effect. Of course, the length of the period of agitation and the intervals at which these take place can be varied by adjusting the timing mechanism as conditions demand or as the grower desires.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A method of pollinating under wind-excluding conditions plants normally fertilized through the action of the wind which comprises supporting said plants as a unit and intermittently agitating the same likewise as a unit.

2. A method of pollinating under wind-excluding conditions plants normally fertilized through the action of the wind which comprises supporting said plants as a unit and automatically agitating the same likewise as a unit at periodic intervals to simulate the action of the wind.

3. A method of pollinating plants grown under wind-excluding conditions, said plants being of a species normally fertilized by the action of the wind, which comprises supporting said plants as a unit, repeatedly displacing said plants as a unit under stress and suddenly replacing said plants as a unit with relief of stress.

4. A method of pollinating tomato plants grown under wind-excluding conditions which comprises supporting a plurality of said plants as a unit and repeatedly agitating said plants, likewise as a unit, for a few minutes at a time during optimum hours of day-light.

5. An apparatus for pollinating plants grown under glass, said plants being of a species normally fertilized by the action of the wind comprising a common means of support for a plurality of said plants, and automatic means for intermittently agitating said common means of support.

6. An apparatus for pollinating plants grown under glass, said plants being of a species normally fertilized by the action of the wind, comprising a common means of support for a plurality of said plants, automatic means for intermittently agitating said common means of support, and timing means for actuating said agitating means.

7. An apparatus for pollinating plants grown under glass, said plants being of a species normally fertilized by the action of the wind, comprising approximately vertical elements supporting each plant, a horizontal element sustaining said vertical elements and plants, transverse members connected to said horizontal elements, and reciprocating means periodically moving said transverse members to agitate the entire structure and the attached plants.

8. An apparatus for pollinating plants grown under glass, said plants being of a species normally fertilized by the action of the wind comprising approximately vertical supporting means for each plant, a horizontal framework disposed above said plants and sustaining said vertical supporting means, resilient elements on said framework and means for repeatedly forcing said framework laterally against said resilient elements and releasing the same.

9. An apparatus for pollinating tomato plants grown under glass which comprises vertical posts set in the ground, cross bars mounted on said posts in slidable relation, a plurality of wires stretched between said cross bars and attached thereto, a plurality of strings suspended between said wires and the ground and serving as supports for tomato vines, and rotatable cams adapted to engage said cross bars and reciprocate the same.

WHEELER LAFFERTY.